United States Patent
Harikumar et al.

(10) Patent No.: US 7,934,001 B2
(45) Date of Patent: Apr. 26, 2011

(54) NETWORK-INITIATED SESSION RECOVERY

(75) Inventors: Gopal Harikumar, Westford, MA (US);
Woojune Kim, Arlington, MA (US);
Dennis Ng, Northboro, MA (US);
Sanjay Cherian, Brookline, NH (US)

(73) Assignee: Airvana Network Solutions, Inc., Chelmsford, MA (US)

( * ) Notice: Subject to any disclaimer, the term of this patent is extended or adjusted under 35 U.S.C. 154(b) by 0 days.

(21) Appl. No.: 12/765,453

(22) Filed: Apr. 22, 2010

(65) Prior Publication Data
US 2010/0202362 A1    Aug. 12, 2010

Related U.S. Application Data

(63) Continuation of application No. 11/562,662, filed on Nov. 22, 2006, now Pat. No. 7,730,189.

(51) Int. Cl.
*G06F 15/16* (2006.01)
*H04Q 7/24* (2006.01)

(52) U.S. Cl. ........................ 709/227; 370/338

(58) Field of Classification Search .............. 709/227
See application file for complete search history.

(56) References Cited

U.S. PATENT DOCUMENTS

| | | |
|---|---|---|
| 6,711,144 B1 | 3/2004 | Kim et al. |
| 6,731,618 B1 | 5/2004 | Chung et al. |
| 6,741,862 B2 | 5/2004 | Chung et al. |
| 6,781,999 B2 | 8/2004 | Eyuboglu et al. |
| 7,170,871 B2 | 1/2007 | Eyuboglu et al. |
| 7,200,391 B2 | 4/2007 | Chung et al. |
| 7,242,958 B2 | 7/2007 | Chung et al. |
| 7,277,446 B1 | 10/2007 | Abi-Nassif et al. |
| 7,299,278 B2 | 11/2007 | Ch'ng |
| 7,336,628 B2 | 2/2008 | Chang et al. |
| 7,346,033 B2 | 3/2008 | Chang et al. |
| 7,512,110 B2 | 3/2009 | Sayeedi et al. |
| 7,558,356 B2 | 7/2009 | Pollman et al. |
| 7,558,588 B2 | 7/2009 | To et al. |
| 7,603,127 B2 | 10/2009 | Chung et al. |
| 7,730,189 B2 | 6/2010 | Harikumar et al. |
| 2002/0196749 A1 | 12/2002 | Eyuboglu et al. |
| 2003/0100311 A1 | 5/2003 | Chung et al. |

(Continued)

FOREIGN PATENT DOCUMENTS

GB    2452688    3/2009

OTHER PUBLICATIONS

3rd Generation Partnership Project 2 "3GPP2", "cdma2000 High Rate Packet Data Interface Specification", C.S0024, version 2, Oct. 27, 2000 (441 pages).

(Continued)

*Primary Examiner* — Ashok B Patel
*Assistant Examiner* — Joseph Gazda
(74) *Attorney, Agent, or Firm* — Fish & Richardson P.C.

(57) ABSTRACT

Techniques for network-initiated session recovery are described. A relationship is maintained between two identifiers both associated with a session between a first device and an access terminal in a wireless network. The first identifier is associated with the first device, and the second identifier is associated with a second device in communication with the first device. After a breach of the session, communications associated with the session are preserved based on the relationship between the first and second identifiers.

20 Claims, 4 Drawing Sheets

U.S. PATENT DOCUMENTS

| | | |
|---|---|---|
| 2003/0223427 A1 | 12/2003 | Chang et al. |
| 2005/0213555 A1 | 9/2005 | Eyuboglu et al. |
| 2005/0243749 A1 | 11/2005 | Mehrabanzad et al. |
| 2005/0245279 A1 | 11/2005 | Mehrabanzad et al. |
| 2006/0067422 A1 | 3/2006 | Chung |
| 2006/0067451 A1 | 3/2006 | Pollman et al. |
| 2006/0126509 A1 | 6/2006 | Abi-Nassif et al. |
| 2006/0159045 A1 | 7/2006 | Ananthaiyer et al. |
| 2006/0240782 A1 | 10/2006 | Pollman et al. |
| 2006/0291420 A1 | 12/2006 | Ng |
| 2006/0294241 A1 | 12/2006 | Cherian et al. |
| 2007/0026884 A1 | 2/2007 | Rao |
| 2007/0058628 A1 | 3/2007 | Rao et al. |
| 2007/0077948 A1 | 4/2007 | Sharma et al. |
| 2007/0097916 A1 | 5/2007 | Eyuboglu et al. |
| 2007/0115896 A1 | 5/2007 | To et al. |
| 2007/0140172 A1 | 6/2007 | Garg et al. |
| 2007/0140184 A1 | 6/2007 | Garg et al. |
| 2007/0140185 A1 | 6/2007 | Garg et al. |
| 2007/0140218 A1 | 6/2007 | Nair et al. |
| 2007/0153676 A1 | 7/2007 | Baglin et al. |
| 2007/0153750 A1 | 7/2007 | Baglin et al. |
| 2007/0153751 A1 * | 7/2007 | Svensson et al. ............ 370/338 |
| 2007/0153753 A1 | 7/2007 | Comstock et al. |
| 2007/0155329 A1 | 7/2007 | Mehrabanzad et al. |
| 2007/0220573 A1 | 9/2007 | Chiussi et al. |
| 2007/0230419 A1 | 10/2007 | Raman et al. |
| 2007/0238442 A1 | 10/2007 | Mate et al. |
| 2007/0238476 A1 | 10/2007 | Raman et al. |
| 2007/0242648 A1 | 10/2007 | Garg et al. |
| 2007/0248042 A1 | 10/2007 | Harikumar et al. |
| 2007/0286095 A1 | 12/2007 | Ottinger |
| 2008/0003988 A1 | 1/2008 | Richardson |
| 2008/0013488 A1 | 1/2008 | Garg et al. |
| 2008/0037500 A1 | 2/2008 | Andrus et al. |
| 2008/0062925 A1 | 3/2008 | Mate et al. |
| 2008/0065752 A1 | 3/2008 | Ch'ng et al. |
| 2008/0069020 A1 | 3/2008 | Richardson |
| 2008/0069028 A1 | 3/2008 | Richardson |
| 2008/0076398 A1 | 3/2008 | Mate et al. |
| 2008/0117842 A1 | 5/2008 | Rao |
| 2008/0119172 A1 | 5/2008 | Rao et al. |
| 2008/0120417 A1 | 5/2008 | Harikumar et al. |
| 2008/0139203 A1 | 6/2008 | Ng et al. |
| 2008/0146232 A1 | 6/2008 | Knisely |
| 2008/0151843 A1 | 6/2008 | Valmikam et al. |
| 2008/0159236 A1 | 7/2008 | Ch'ng et al. |
| 2008/0162924 A1 | 7/2008 | Chinitz et al. |
| 2008/0162926 A1 | 7/2008 | Xiong et al. |
| 2008/0253550 A1 | 10/2008 | Ch'ng et al. |
| 2008/0254792 A1 | 10/2008 | Ch'ng |
| 2009/0034440 A1 | 2/2009 | Samar et al. |
| 2009/0082020 A1 | 3/2009 | Ch'ng et al. |
| 2009/0088155 A1 | 4/2009 | Kim |
| 2009/0116445 A1 | 5/2009 | Samar et al. |
| 2009/0154447 A1 | 6/2009 | Humblet |
| 2009/0156165 A1 | 6/2009 | Raghothaman et al. |
| 2009/0156195 A1 | 6/2009 | Humblet |
| 2009/0156218 A1 | 6/2009 | Garg et al. |
| 2009/0163202 A1 | 6/2009 | Humblet et al. |
| 2009/0163216 A1 | 6/2009 | Hoang et al. |
| 2009/0163238 A1 | 6/2009 | Rao et al. |
| 2009/0164547 A1 | 6/2009 | Ch'ng et al. |
| 2009/0168766 A1 | 7/2009 | Eyuboglu et al. |
| 2009/0168788 A1 | 7/2009 | Den et al. |
| 2009/0170440 A1 | 7/2009 | Eyuboglu et al. |
| 2009/0170475 A1 | 7/2009 | Ch'ng et al. |
| 2009/0170520 A1 | 7/2009 | Jones |
| 2009/0170547 A1 | 7/2009 | Raghothaman et al. |
| 2009/0172169 A1 | 7/2009 | Ch'Ng et al. |
| 2009/0172397 A1 | 7/2009 | Kim |
| 2009/0186626 A1 | 7/2009 | Raghothaman et al. |
| 2009/0262697 A1 | 10/2009 | To et al. |
| 2009/0318162 A1 | 12/2009 | Chung et al. |
| 2010/0054219 A1 | 3/2010 | Humblet et al. |
| 2010/0075658 A1 | 3/2010 | Hou et al. |
| 2010/0202362 A1 | 8/2010 | Harikumar et al. |

OTHER PUBLICATIONS

3rd Generation Partnership Project 2 "3GPP2", "cdma2000 High Rate Packet Data Interface Specification", C.S0024-A, version 2, Jul. 2005 (1227 pages).

3rd Generation Partnership Project 2 "3GPP2", "cdma2000 High Rate Packet Data Interface Specification", C.S0024-B, version 1, Apr. 2006 (1623 pages).

3rd Generation Partnership Project 2 "3GPP2", "cdma2000 High Rate Packet Data Interface Specification", C.S0024-B, version 2, Mar. 2007 (11627 pages).

3rd Generation Partnership Project 2 "3GPP2", "cdma2000 High Rate Packet Data Interface Specification", C.S0024, version 4, Oct. 25, 2002 (548 pages).

Paul Bender, et al., "CDMA/HDR: A Bandwidth-Efficient High-Speed Wireless Data Service for Nomadic Users", IEEE Communications Magazine, Jul. 2000.

Paul Bender & Ramin Rezalifar, "Draft Baseline Text for the 1xEV-DO Upper Layers (excluding Physical Layer)", 3GPP2, Aug. 17, 2000.

3GPP2, "3GPP2 Access Network Interfaces Interoperability Specification 2, Release A," Jun. 2000.

TIA/EIA/TSB-115, "Wireless IP Architecture Based on IETF Protocols", Jun. 6, 2000.

3GPP2, "Wireless IP Network Standard", 3rd Generation Partnership Project 2 (3GPP2), Version 1.0.0, Jul. 14, 2000.

* cited by examiner

NETWORK-INITIATED SESSION RECOVERY

CLAIM OF PRIORITY

This application is a continuation and claims priority under 35 U.S.C. §120 to U.S. patent application Ser. No. 11/562,662, filed Nov. 22, 2006, now U.S. Pat. No. 7,730,189 the entire contents of which are hereby incorporated by reference.

TECHNICAL FIELD

This disclosure relates to network-initiated session recovery.

BACKGROUND

In a fixed or mobile wireless Internet Protocol (IP) network, a client-side device establishes a session with a network-side access device to communicate with other entities in that network. The session represents the client-side device to the network, and includes information about the client-side device such as its IP address, location within a mobility area, permitted services and other such attributes required to communicate with the client-side device. The session is typically present as long as the client-side device is present in the network, though other resources required for direct communication between the client-side device and the network device may only be in use when active communication is in process.

The state of direct communication between the client-side device and the network-side device is known as a connection. In cellular wireless systems, as the client device must initiate connection, a special procedure known as paging is used to allow the network to request the client device to communicate. For example, if a network device needs to send data to a client device, the network uses the information stored in a session associated with the client device to page the client device. Paging involves transmitting a message addressed to a particular client device ("target client device") over a shared channel monitored by multiple client devices in communication with that part of the network. This page causes the target client device to initiate a connection with the network, thus enabling an exchange of data. However, if a hardware or software failure of a network-side device causes the network to lose the session information, the network cannot establish a direct communication with the target client device, as it has lost all knowledge of the device's identity, communication parameters and location required to page that particular device. A session for which session information has been lost due to hardware or software failure of a network-side device is referred to in this description as a "breached session." Because the session breach is not visible at the IP (Internet Protocol) layer, the client device's peers are unaware that the client device is unreachable. Thus, network-initiated connection-oriented applications such as online video teleconferencing and Internet telephony are particularly vulnerable to network-side failures. Furthermore, the client device is not immediately aware that the session breach has occurred and its recovery mechanisms operate on a sufficiently long timescale that client-initiated creation of a new session cannot be counted upon to restore network reachability for that client before it is required.

SUMMARY

In general, in one aspect, the invention features methods and computer programs for network-initiated session recovery in which first and second identifiers are assigned to a session between an access terminal and a first device (e.g., radio network controller) of a wireless network. The first identifier, e.g., Universal Access Terminal Identifier (UATI), is associated with the access terminal, and the second identifier, e.g., Packet Session Identifier (PSI), corresponds to a communication path between the first device and a second device (e.g., a packet data serving node) of the wireless network. The communication path is configured to transport data corresponding to the session. A relationship is established between the first identifier and the second identifier.

In general, in another aspect, the invention features methods and computer programs for preserving communications in a network after a session breach. A relationship is maintained between two identifiers both associated with a session between a first device and an access terminal in a wireless network. The first identifier is associated with the first device, and the second identifier is associated with a second device in communication with the first device. After a breach of the session, communications associated with the session are preserved based on the relationship between the first and second identifiers.

In general, in a further aspect, the invention features a radio network controller having a radio node server module and a controller. The radio node server module is configured to establish a session with an access terminal. The controller is configured to assign first and second identifiers to the session, the first identifier being associated with the radio node server module, and the second identifier corresponding to a communication path between the radio node server module and a packet data serving node, the first and second identifiers having a relationship with respect to one another. The controller is also configured to detect a breach of the session established between the radio node service module and the access terminal; and to preserve communications associated with the session after the breach using the relationship between the first and second identifiers.

Implementations may include one or more of the following. At least a portion of the first identifier may be included in the second identifier. In the first identifier, a unique identifier corresponding to the first device may be included. The second identifier may be received in a data packet that is transported from the second device to the access terminal over the communication path. Information corresponding to a number of times the first device was rebooted may be incorporated into the first identifier. The reboot value may be extracted from the second identifier, which may be included in a data packet received from the second device, and compared to a reboot count stored in the first device. Based on the comparison, it may be determined that the first identifier was assigned before the first device was last rebooted if the reboot count is greater than the reboot value.

After a session breach, the first identifier may be constructed using the relationship. For example, a portion of information from the second identifier may be extracted and concatenated with an identifier associated with the first device. The reconstructed first identifier may be included in a message that is used to page the access terminal. For example, the message may be configured to cause the access terminal to close the breached session and initiate a new session with the first device. The breached session may then be closed and a new session between the first device and the access terminal may be established. Information associated with the breached session may be transferred to a new session established between the access terminal and the first device. The assigning of the identifiers, preservation of communications, and/or the identifiers themselves may comply with a 1× Evolution- Data Optimized protocol. Furthermore, the radio network controller or components thereof may also comply with a 1× Evolution-Data Optimized protocol.

Advantages may include one or more of the following. The preservation and recovery of communication sessions with client devices in a wireless network communication system can be achieved despite a failure of one or more components of the communications system. Network reachability can be restored transparently in the event of a network-side system failure without the use of highly redundant hardware and software solutions. When there has been a failure in a network-side device resulting in loss of session information, the affected client devices lose contact with the network only for the duration of the session configuration and yet remains reachable from the network side. A network-side device (e.g., a radio network controller) can use a session close message to reestablish session information lost due to a network-side failure, such as a failure of a radio network session module within the radio network controller. As session preservation does not require the network to maintain a complete backup of each session established on the network at a particular time, memory and computational resources of the network are conserved and made available for additional users.

The details of one or more embodiments of the invention are set forth in the accompanying drawings and the description below. Other features, objects, and advantages of the invention will be apparent from the description and drawings, and from the claims.

DETAILED DESCRIPTION

In some conventional systems, to reduce the likelihood of losing session information caused by a network-side failure, a copy of all session information is saved at an alternate location in the network that is not likely to fail at the same time as the device that is hosting the session. In these systems, when a session breach occurs, a mechanism is implemented to restore the breached session with the client-side device at the appropriate state. Restoring a breached session using the saved copy of session information can be complex and often requires external hardware and additional memory and computational resources.

Figure 1:
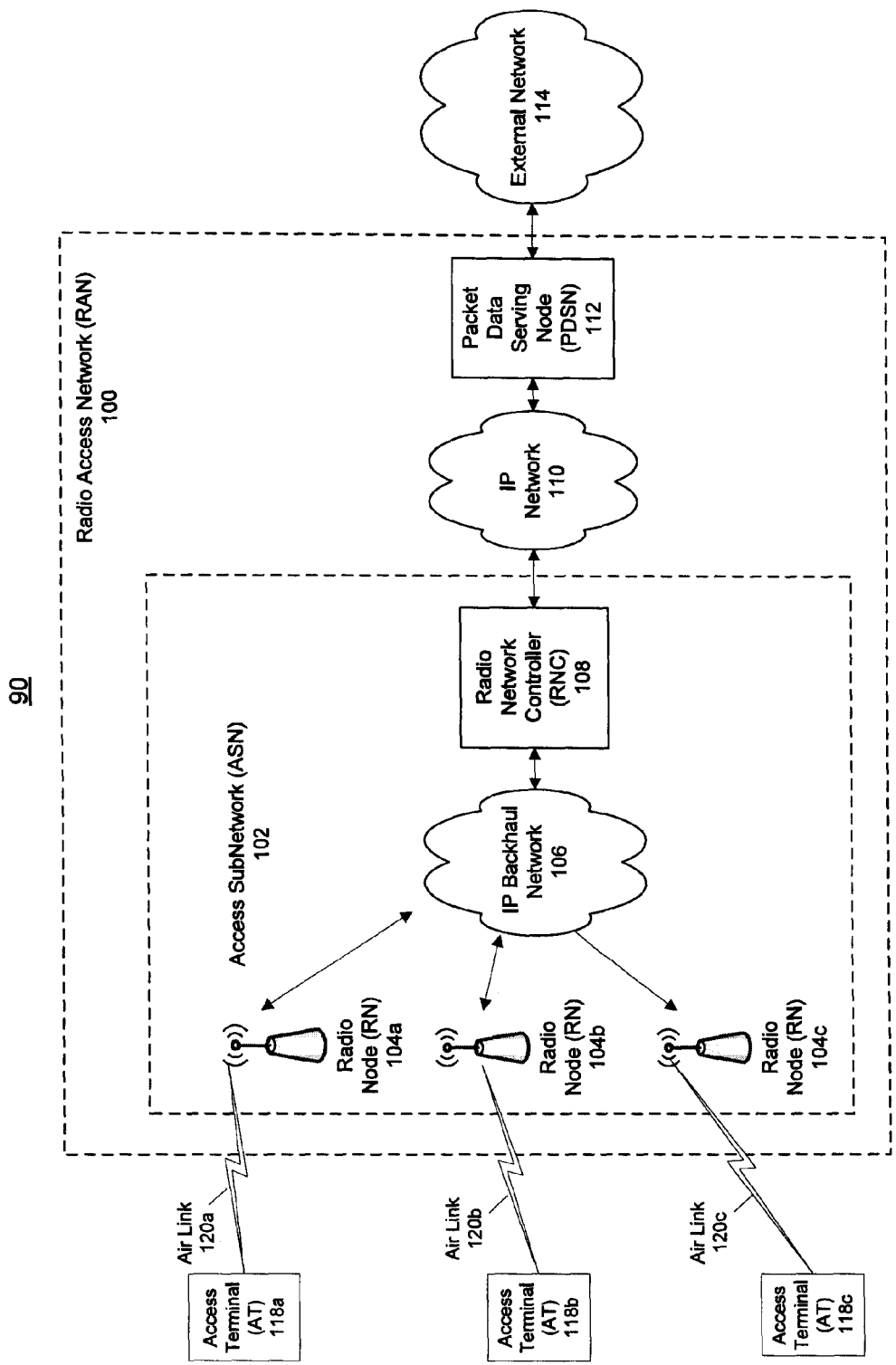
FIG. 1 is a block diagram of a wireless network system.

Referring to FIG. 1, a radio access network (RAN) 100 of a wireless network communication system 90 preserves session information after a session breach by transmitting a message to a client-side device instructing the client-side device to close the current session and reopen a new session with the network. For example, the 1×-Evolution Data Optimized (1×EV-DO) protocol currently defined in the IS856 family of standards, as defined by the 3GPP2 organization, provides for a "session close message" that is sent by a network-side device to a client-side device. When a client-side device (also referred to in this description as an "access terminal") receives a session close message, it is required under the 1×EV-DO protocol to close its current session with the network and open a new session. Over the new session, communications between the client-side device and the network are resumed as if there had been no session breach in the first place. Thus, when there has been a failure in a network-side device resulting in loss of session information, the affected users remain reachable from the network side, losing contact with the network only for the duration of the session configuration.

Client devices that participate in network-initiated applications such as telephony generally always reopen new sessions as long as they are powered on. Therefore, a network-side device can use a session close message to reestablish session information lost due to a network-side failure. Moreover, because the information necessary to generate and transmit a session close message is less than the total amount of session information stored by a network-side device, the network does not need to maintain a complete backup of each session established on the network at a particular time. The benefit of this is that the network can maintain a larger number of user sessions for a given amount of memory available on the network-side device.

The wireless network 90 includes an external network 114 (e.g., the Internet) and a radio access network (RAN) 100 that uses communication protocols to transmit data packets between access terminals (AT) 108a-c and the external network 114. The RAN 100 is configured to support various mobile wireless access technologies, an example of which is 1×EV-DO (1×EV-DO).

High Data Rate (1×EV-DO) is an emerging mobile wireless access technology that enables personal broadband Internet services to be accessed anywhere, anytime (see P. Bender, et al., "CDMA/1×EV-DO: A Bandwidth-Efficient High-Speed Wireless Data Service for Nomadic Users", IEEE Communications Magazine, July 2000, and 3GPP2, "Draft Baseline Text for 1×EV-DO," Aug. 21, 2000). Developed by Qualcomm, 1×EV-DO is an air interface optimized for Internet Protocol (IP) packet data services that can deliver a shared forward link transmission rate of up to 2.46 Mbit/s per sector using only (1×) 1.25 MHz of spectrum. Compatible with CDMA2000 radio access (TIA/EIA/IS-2001, "Interoperability Specification (IOS) for CDMA2000 Network Access Interfaces," May 2000) and wireless IP network interfaces (TIA/EIA/TSB-115, "Wireless IP Architecture Based on IETF Protocols," Jun. 6, 2000, and TIA/EIA/IS-835, "Wireless IP Network Standard," 3rd Generation Partnership Project 2 (3GPP2), Version 1.0, Jul. 14, 2000), 1×EV-DO networks can be built entirely on IP technologies, all the way from the mobile Access Terminal (AT) to the global Internet, thus taking advantage of the scalability, redundancy and low-cost of IP networks.

Examples of communication protocols used by the RAN 100 include, the evolution data-only (1× EV-DO) protocol and other CDMA 2000 protocols. The 1× EV-DO protocol is an evolution of the current 1×RTT standard for high-speed data-only (DO) services and has been standardized by the Telecommunication Industry Association (TIA) as TIA/EIA/IS-856, "CDMA2000 High Rate Packet Data Air Interface Specification", 3GPP2 C.S0024-0, Version 4.0, Oct. 25, 2002, which is incorporated herein by reference. Revision A to this specification has been published as TIA/EIA/IS-856, "CDMA2000 High Rate Packet Data Air Interface Specification", 3GPP2 C.S0024-A, Version 2.0, June 2005, and is also incorporated herein by reference.

The RAN 100 includes one or more Access Sub-Networks (ASNs), e.g., ASN 102, an IP network 110, and a packet data serving node (PDSN) 112 connected to the ASN 102 over the IP network 110. The ASN 102 includes a radio network controller (RNC) 108, an IP backhaul network 106, and multiple radio nodes (RN), three of which are shown 104a-c, that each communicate with access terminals (ATs) 118a-c using respective airlinks 120a-c. The RNC 108 communicates with the PDSN 112 over the IP network 110. The PDSN 112, in turn, receives and transmits data packets (e.g., voice over IP packets) between the RNC 108 and external devices (e.g., servers) connected to the external network 114. The RNC 108 communicates with the RNs 104a-c over the access IP backhaul network 106 and controls their transmitters and receivers, initiates and maintains client sessions, directs data packets received from PDSN 112, and performs other radio access and link maintenance functions such as soft handoff and sector selection.

The IP network 110 and the IP backhaul network 106 are networks of devices that use the TCP/IP network protocols to exchange data. The IP network 110 and the IP backhaul network 106 may each comprise the public Internet or a private intranet.

The external network 114 is a network of devices that use the TCP/IP network protocols to exchange data and can be implemented in a variety of ways. For example, the external network 114 may include any kind and any combination of networks such as an Internet, a local area network (LAN) or other local network, a private network, a public network, a plain old telephone system (POTS), or other similar wired or wireless networks. The external network 114 can also include additional elements such as communication links, proxy servers, firewalls or other security mechanisms, Internet Service Providers (ISPs), gatekeepers, gateways, switches, routers, hubs, client terminals, and other elements. Communications through the external network 114 can include any kind and any combination of communication links such as modem links, Ethernet links, cables, point-to-point links, infrared connections, fiber optic links, wireless links, cellular links, Bluetooth®, satellite links, and other similar links. Communications through the RAN 100, the external network 114, or both may be secured with a mechanism such as encryption, a security protocol, or other type of similar mechanism.

The ATs 118a-c, are the client-side of the wireless network and Internet protocol, and may be implemented as a mobile device such as a cellular telephone, a wireless PDA, a hand-held gaming device, or a wireless laptop computer, or a stationary device such as a desktop computer, or other fixed device with which wireless communication is desired.

As previously mentioned, a session must be established before data can be exchanged. In 1×-EVDO systems a session is a shared state between the RAN 100 and an AT that defines the basis for communication between the network and the user. Session information is typically stored within the RNC 108.

Figure 2:
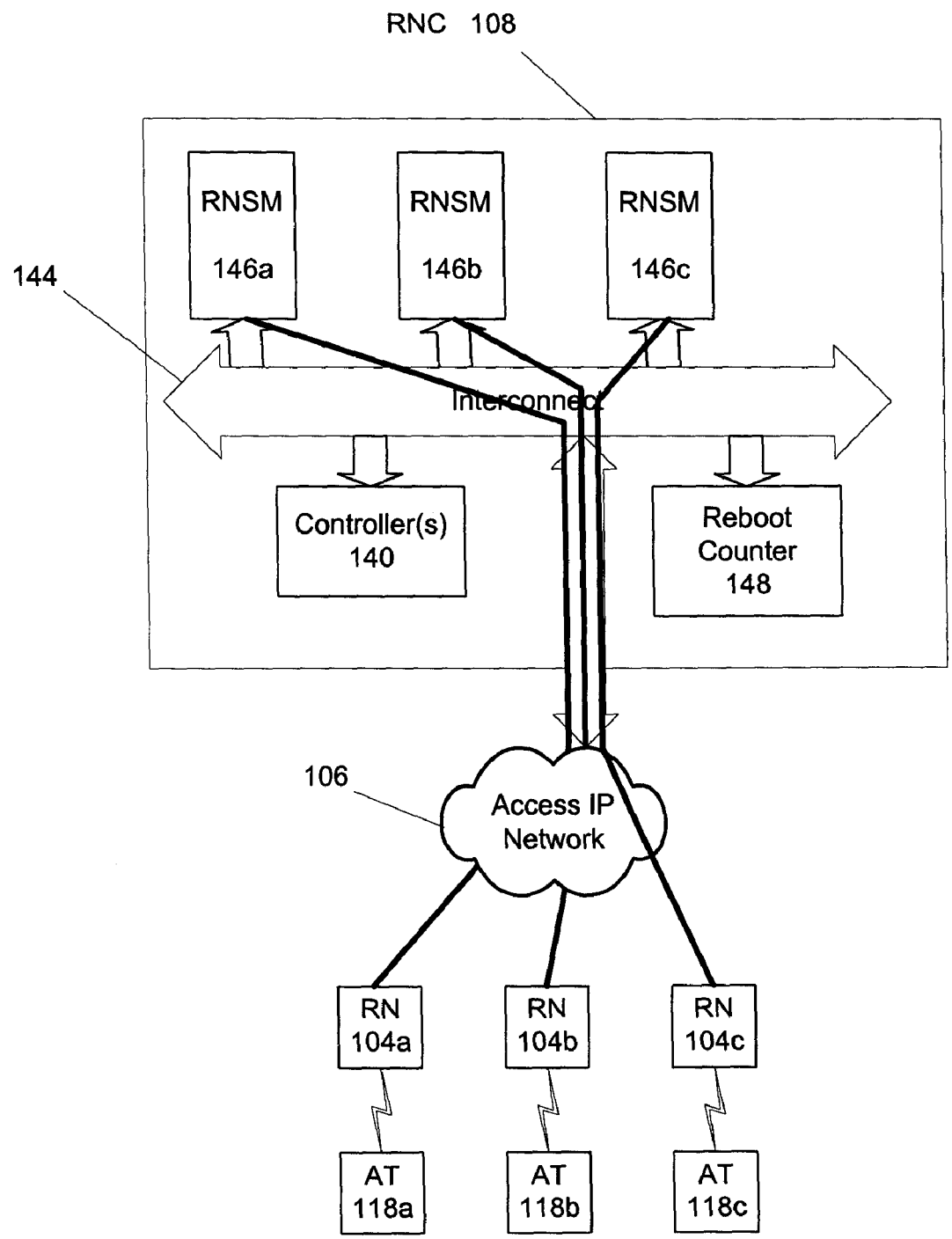
FIG. 2 is a block diagram of a radio network controller.

Referring to FIG. 2, the RNC 108 includes one or more controller(s) 140, one or more radio network session modules (RNSMs) 146a-c, and a reboot counter 148 that are interconnected over a high-speed bus 144 such as a PCI, VMEbus, USB, ISA, or PXI bus or switched fabric such as ATM (or other cell-based fabric) or Ethernet (or other packet-based fabric). An RNC could consist of multiple hardware units. The RNSMs 146a-c contribute storage and processing power to the RNC 108. In some embodiments, the RNSMs are implemented as individual hardware units (e.g., cards that fit into slots of a chassis). In other embodiments, multiple RNSMs are implemented with a single hardware unit.

Each of the three RNSMs 146a-c shown communicates with ATs 118a-c using the radio nodes 104a-b. In practice, each RNSM 146a-c will typically use multiple radio nodes to communicate with many ATs at any particular time. For simplicity, however, only one radio node per RNSM and one AT per node are illustrated. Each RNSM 146a-c is responsible for establishing and maintaining a session with the ATs 118a-c that they are assigned to handle. In some embodiments, the sessions hosted by the RNC 108 are distributed among multiple RNSMs.

The controller 140, which may include multiple controllers, generally functions to perform protocol route computations, system configuration, network management, and centralized signaling. In some embodiments, the controller 140 also maintains a database of the current sessions established between the RNSMs 46a-46c and the ATs 118a-c. This database is normally not a backup of all session information maintained by the RNSMs but includes information sufficient to identify the RNSM on which a particular session is hosted. The controller 140 also performs functions to connect the RNC 108 with the PDSN 112 over the IP network 110. The controller 140 receives packets from the PDSN 112 destined for the RNs 104a-c (and vice versa) and routes the packets to the appropriate RNSMs 146a-c. In some embodiments, the controller 140 itself is an RNSM.

The reboot counter 148 keeps track of the number of times an associated RNSM (e.g., RNSM 146a) has been rebooted. Initially, the reboot counter 148 is set to zero. Each time the RNSM reboots, the reboot counter 148 increments its count by one. In some embodiments, the reboot counter 148 keeps track of the number of times the RNC 108 has been rebooted.

A session has multiple identifiers associated with it that are used to uniquely identify a specific AT (or user thereof) in specific contexts. One such identifier is the Universal Access Terminal Identifier (UATI). A UATI associates a session and an AT for which the session is established and is generally used by the AT for sending communications to the appropriate RNSM on which the session is implemented. This identifier exists as part of the 1×EV-DO protocol stack and exists only within the RAN 108. Other network elements beyond the RNC 108 (like the PDSN 112) are not aware of this identifier. A Packet Session Identifier (PSI) is another identifier associated with a session and is used to identify a communication path that transports data specific to that session between the PDSN 112 and the RNC 108 over the IP network 110. In some embodiments, a session utilizes multiple communication paths, each of which may be specific to an application being accessed by the user. Communication paths are also referred to in this description as "A10 data tunnels." PSI identifiers are assigned autonomously by an RNSM to the A10 data tunnels between the PDSN 112 and the RNC 108.

For packets received from the PDSN 112, the controller 140 determines the PSI of the A10 tunnel over which the packet was sent and uses the PSI to determine the identity of the RNSM (e.g., RNSM 146a) on which the corresponding session is located. In some embodiments, the controller 40 looks up the RNSM that matches the PSI from a PSI forwarding table stored in the RNC 108.

In a conventional 1×-EVDO system, if one or more of the RNSMs were to fail, all the session information hosted on these RNSMs would be lost. Such a failure would have severe consequences to multimedia applications being run on the affected ATs. For example, an affected AT that wishes to access the RAN would have to re-establish a session first, leading to increased delay experienced by the user. More seriously, traffic destined for the AT from the network side (e.g., PDSN) would be lost, as the RNC would not be able to identify the mobile.

The UATI and the PSI identifiers used in conventional 1×-EVDO system may be assigned independently as far as the applicable specifications and standards are concerned. For example, the UATI and the PSI identifiers used in conventional 1×-EVDO systems, in general, have no relationship with respect to each other. However, by establishing relationships between UATI and PSI identifiers, the RNC 108 can identify and contact access terminals whose sessions are lost due to network-side failures.

Figure 3:
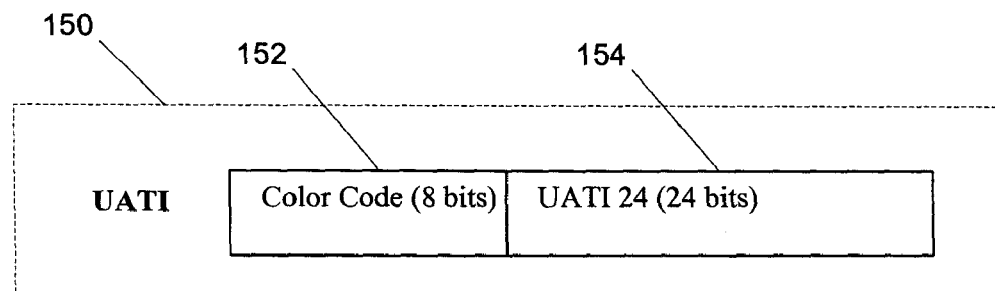
FIG. 3 is diagram of a UATI identifier.

Referring to FIG. 3, an example of a UATI 150 is shown. The UATI 150 includes a color code 152 and a UATI24 field 154. The color code identifies the RNC 108 hosting the session that is assigned the UATI 150. In some embodiments, identifiers assigned to each of the RNSMs 146*a-c* of the RNC 108 include all or a portion of the color code 152. For example, the first eight bits of each of the identifiers assigned to the RNSMs 146*a-c* may encode the color code 152. The UATI24 field 154 includes the least significant 24 bits of the UATI 150.

Figure 4:
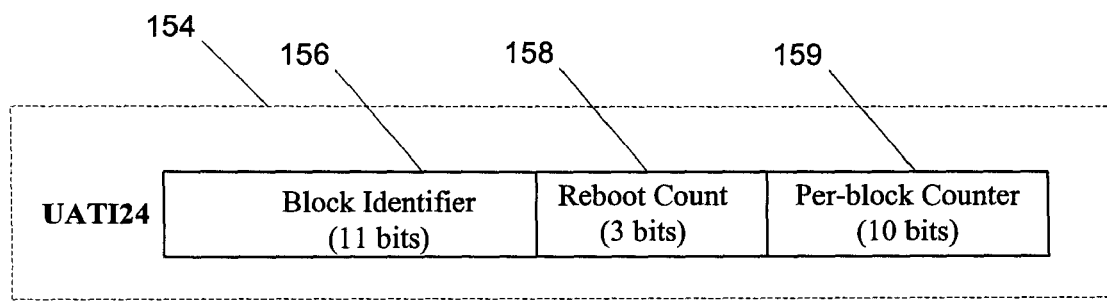
FIG. 4 is a diagram of a UATI24 identifier.

Referring to FIG. 4, the UATI24 field 154 includes a block identifier 156, a reboot count field 158, and a per-block counter field 159. The block identifier 156 forms the 11 most significant bits of the UATI24 field 154 and defines the block a contiguous set of UATIs to which the UATI 150 belongs. The next three bits, i.e., bits 12 to 10, contain the reboot count field 158. The reboot count field 158 holds the value of the reboot counter 148 (FIG. 2) when the UATI 150 is assigned to an access terminal. By comparing the value held in the reboot count field 158 and the value of its own reboot counter 148, the RNC 108 can determine whether the UATI 150 was assigned during the last "bootup" of the RNC 108. For example, if the value in the reboot count field 158 is less than the current value of the reboot counter 148, the RNC 108 determines that the UATI 150 had been assigned before the RNC 108 last rebooted. The per-block counter field 159, composed of the least significant 10 bits of the UATI24 field 154, is assigned autonomously by an RNSM to sessions hosted by it. The per-block counter field 159 is identifies which RNSM within the RNC 108 hosts the session. In some embodiments, the per-block counter field is populated by a slot counter.

Figure 5:
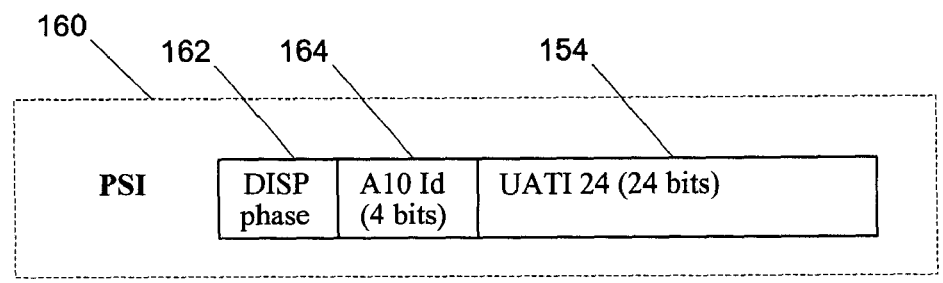
FIG. 5 is a diagram of a PSI identifier.
Figure 6:
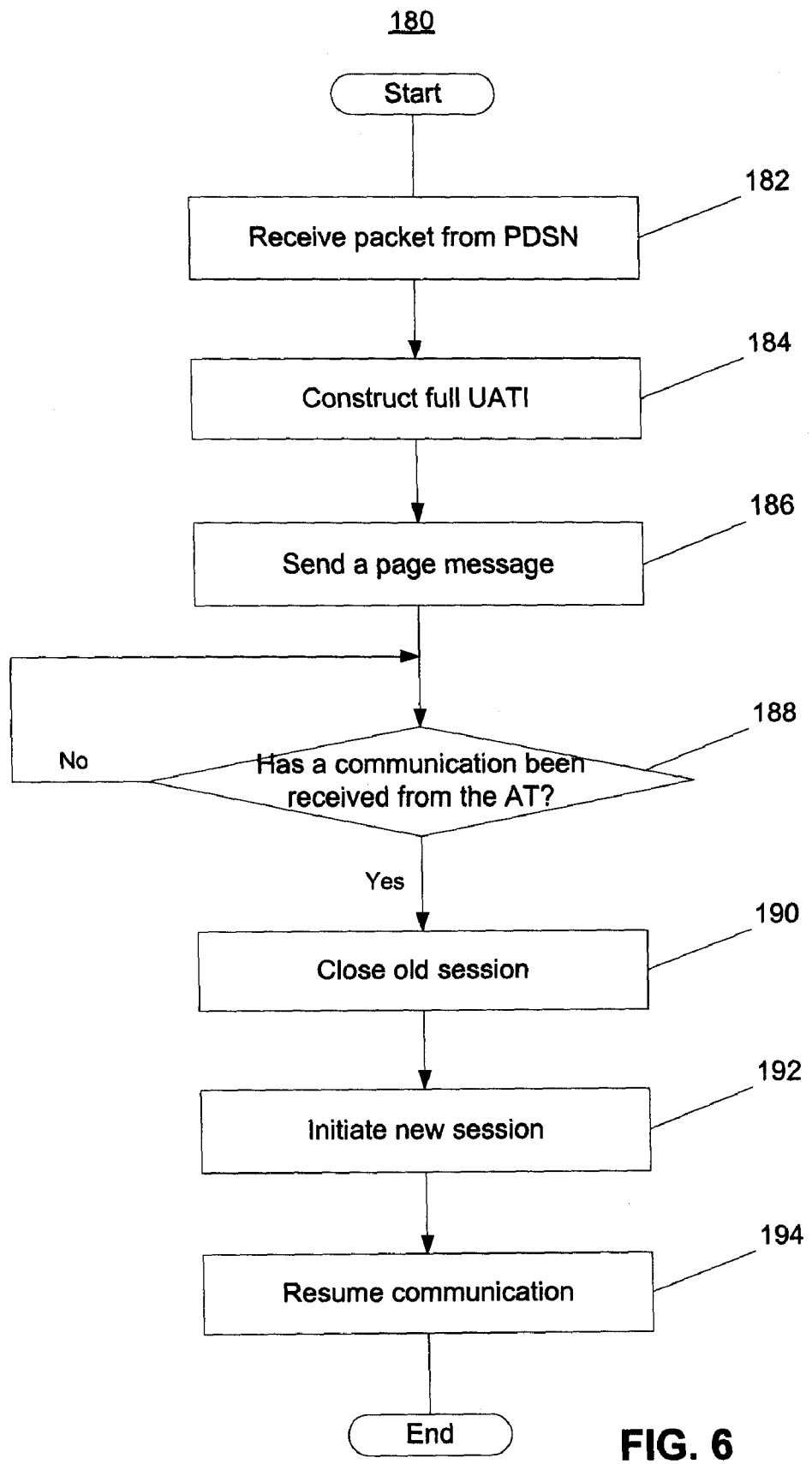
FIG. 6 is a flow diagram of a process for preserving a breached session.

Referring to FIG. 5, an example of a PSI 160 is shown. The PSI 160 is composed of the 24-bit UATI 154, also included in the UATI 150 of FIG. 3, a 4-bit Default Idle State Protocol (DISP) paging phase field 162, and a 4-bit A10 identifier 164.

The DISP paging phase field 162 includes the phase that is agreed upon between the AT (e.g., AT 108*a*) and the RNSM during the configuration of the session to which the PSI 160 is assigned. The phase included in the DISP paging phase field 162 identifies the specific time or time slot that the RNC 108 can reach the AT. The DISP field 162 is used to contact ATs in cases of session loss, as will be explained below in connection with FIG. 7. In some cases, the AT might change the DISP by sending a preferred control channel cycle attribute to the RNC. In such cases, the DISP field 162 in the PSI 160 is changed to use the new value. The A10 identifier 164 identifies a specific A10 tunnel associated with the session. A session could have multiple A10s associated with it.

In some embodiments, the controller 140 assigns individual UATIs to specific users. When a particular RNSM (e.g., RNSM 146*a*) needs to assign a UATI to an AT (e.g., AT 118*a*), it sends a message to the controller 140, which in turn, responds with a UATI. In these embodiments, because session-specific information is stored on the controller 140 it is often difficult to recover this information if the controller 140 fails.

In other embodiments, the RNSMs 146*a-c* assign the UATIs themselves. To ensure uniqueness, each of the UATIs includes a field that encapsulates the slot number of the assigning RNSM. The controller 140 is configured to route each packet by extracting the slot number from each UATI. With this approach, preserving sessions in the event of an RNSM failure is a difficult and complex task. For instance, if an RNSM fails and reboots, the sessions hosted by that RNSM would need to be taken over by another RNSM, and embedding the slot number would not be feasible.

In further embodiments that remedy some of the problems associated with the foregoing UATI assignment approaches, the controller 140 assigns blocks of UATIs to specific RNSMs, rather than individual UATIs. Each block consists of a contiguous set of 1024 UATIs. Each block is identified by a unique 11-bit block identifier. As shown in FIG. 4, the block identifier of a particular block is included in the block identifier field 156 of the UATI 150 belonging to that block.

In normal operation, when the RNC 108 receives a packet from a radio node (e.g., RN 146*a*), the RNC 108 reads the UATI 150 from the packet and extracts the UATI 24 identifier 154 contained in the UATI 150. The RNC 108 determines the RNSM corresponding to the UATI 24 identifier 154 (e.g., using an array-based lookup table) and routes the packet to that RNSM. When the RNC 108 receives a packet from the PDSN 112, the RNC 108 reads (194) the PSI from the packet and extracts the UATI 24 identifier 154 contained in the PSI 160. The RNC 108 determines the RNSM corresponding to the UATI 24 identifier 154 (e.g., using an array-based lookup table) and routes the packet to that RNSM.

Referring to FIG. 7, the RNC 108 implements a process 180 for preserving a breached session using the relationship between the UATI 150 and the PSI 160. Although the breached session could established between RNC 108 and any of ATs 118*a-c*, for ease of explanation, the breached session is described in connection with the AT 118*a*. Supposing that a server connected to the external network 114 (e.g., the Internet) is attempting to contact the AT 118*a* that used to have a session on the RNSM 146*a* before the RNSM 146*a* failed. In this scenario, the RNC 108 receives (182) the packet from the PDSN 112 over an unrecognized A10 tunnel. From the reboot count stored in the reboot-count field 158 of the UATI24 field 154 of the PSI 160, the RNC 108 determines that this packet corresponds to a lost session. This is because the reboot count field 158 of the UATI24 154 of the PSI 160 contains a reboot count that indicates to the RNC 108 that the corresponding UATI 150 that was assigned to the session was issued in a previous incarnation. In other words, the reboot count indicates that the RNC 108 has been rebooted after this UATI 150 had been assigned to the session between the AT 118*a* and the RNSM 146*a*. At this point, the RNC 108 does not know if the AT 118*a* has a new session or what its UATI is if it has already been assigned a new session.

The RNC 108 constructs (184) the full, 32 bit UATI 150 by concatenating its color code, which is the same as the color code 152 belonging to the UATI 150 had been assigned to the AT 118*a*, with the UATI 24 154 determined from the PSI 160 of the packet. The RNC 108 sends (186) a session close message to the AT 118*a* over the phase specified in the DISP phase field 162 of the PSI 160. The session close message includes the reconstructed UATI 150. If the AT 118*a* is in the network and has not been issued a new UATI, it will recognize the UATI 150 included in the session close message. According to the 1×EVDO standard, after receiving the session close message, the AT 118*a* is required to attempt to contact the RAN 100. The RNC 108 determines (188) whether a communication has been received from the AT 118*a*. Upon receiving a communication sent from the AT 118*a*, the RNC 108 closes (190) the old session that had been breached and the AT 118*a* subsequently initiates (192) a new session with the RNC 108. The RNC 108 resumes (194) communication with the AT 118*a* as if the session breach never occurred. Thus, the AT 118a has been out of contact with the RAN 100 only for the duration of the session configuration.

Although the techniques described above employ the 1×EV-DO air interface standard, the techniques are also applicable to other CDMA and non-CDMA air interface technologies in which an access terminal communicates over a wireless network.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the techniques described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element, for example, by clicking a button on such a pointing device). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques described herein can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact over a communication network. The relationship of client and server arises by virtue of computer programs running on the respective computers and having a client-server relationship to each other.

Other embodiments are within the scope of the following claims. The following are examples for illustration only and not to limit the alternatives in any way. The techniques described herein can be performed in a different order and still achieve desirable results. For example, the number of bits for the reboot counter and the block ID can be different. An RNSM slot ID counter may be provided in place of the block ID counter to provide a simpler implementation in which the mapping from the block ID to the RNSM is no longer needed since the slot ID already identifies the RNSM card slot.

What is claimed is:

1. A method comprising:
   assigning a first identifier and a second identifier to a session between an access terminal and a first device of a wireless network, the first identifier being associated with the access terminal, the second identifier being associated with a communication path for the first device of the wireless network, and the second identifier comprising a portion of information and the first identifier comprising a same portion of the information;
   detecting a breach of the session between the access terminal and the first device of the wireless network;
   generating a reconstructed first identifier at least partly based on the portion of information of the second identifier;
   causing, based on the reconstructed first identifier, a new session to be established between the access terminal and the first device of the wireless network;
   incorporating into the first identifier information a reboot count corresponding to a number of times the first device of the wireless network was rebooted;
   extracting a reboot value from the second identifier included in a data packet received from a second device of the wireless network;
   comparing the reboot value to the reboot count; and
   determining that the first identifier was assigned before the first device was last rebooted if the reboot count is greater than the reboot value.

2. The method of claim 1, wherein the same portion of the information comprises a unique identifier corresponding to the first device of the wireless network.

3. The method of claim 1, wherein the first device of the wireless network comprises a radio network controller.

4. The method of claim 1, further comprising receiving the second identifier in a data packet that is transported from the second device to the access terminal over the communication path.

5. The method of claim 1, wherein the communication path comprises a communication path between the first device and the second device of the wireless network, and wherein the second device comprises a packet data serving node.

6. The method of claim 1, wherein assigning the first identifier comprises assigning a Universal Access Terminal Identifier (UATI) to the session.

7. The method of claim 1, wherein assigning the second identifier comprises assigning a Packet Session Identifier (PSI) to the session.

8. The method of claim 1, wherein assigning the first identifier and the second identifier comprises complying with a 1× Evolution-Data Optimized protocol.

9. The method of claim 1, wherein, after the breach, the method further comprises:
including the reconstructed first identifier in a message; and
paging the access terminal with the message, the message being configured to cause the access terminal to close the session and initiate the new session with a third device of the wireless network.

10. The method of claim 1, further comprising:
extracting the portion of information from the second identifier; and
concatenating the portion with an identifier associated with a third device of the wireless network to reconstruct the first identifier.

11. The method of claim 1, further comprising:
closing the session;
establishing the new session between the first device of the wireless network and the access terminal; and
transferring information associated with the session to the new session established between the access terminal and the first device of the wireless network.

12. A radio network controller comprising:
a radio node server module configured to establish a session with an access terminal; and
a controller configured to:
assign a first identifier and a second identifier to the session, the first identifier being associated with the radio node server module, the second identifier being associated with a communication path for the radio node server module, and the second identifier comprising a portion of information and the first identifier comprising a same portion of the information;
detect a breach of the session established between the radio node service module and the access terminal;
generate a reconstructed first identifier at least partly based on the portion of the information of the second identifier;
cause, based on the reconstructed first identifier, a new session to be established between the radio node server module and the access terminal;
incorporate into the first identifier information a reboot count corresponding to a number of times the radio node server module was rebooted;
extract a reboot value from the second identifier;
compare the reboot value to the reboot count; and
determine that the first identifier was assigned before the radio node server module was last rebooted if the reboot count is greater than the reboot value.

13. The radio network controller of claim 12, wherein the first identifier comprises a Universal Access Terminal Identifier (UATI), and the second identifier comprises a Packet Session Identifier (PSI).

14. The radio network controller of claim 12, wherein, after the breach, the controller is further configured to:
include the reconstructed first identifier in a message; and
page the access terminal with the message, the message being configured to cause the access terminal to close the session and initiate the new session with another radio node server module.

15. The radio network controller of claim 12, wherein the controller is further configured to:
extract the portion of information from the second identifier; and
concatenate the portion with an identifier associated with the radio network controller to reconstruct the first identifier.

16. The radio network controller of claim 12, wherein the controller is further configured to comply with a 1× Evolution-Data Optimized protocol.

17. A non-transitory computer-readable storage medium bearing instructions to cause a radio network controller to:
assign a first identifier and a second identifier to a session between an access terminal and a first device of a wireless network, the first identifier being associated with the access terminal, the second identifier being associated with a communication path for the first device of the wireless network, and the second identifier comprising a portion of information and the first identifier comprising a same portion of the information;
detect a breach of the session between the access terminal and the first device of the wireless network;
generate a reconstructed first identifier at least partly based on the portion of the information of the second identifier;
cause, based on the reconstructed first identifier, a new session to be established between the access terminal and the first device of the wireless network;
incorporate into the first identifier information a reboot count corresponding to a number of times the first device of the wireless network was rebooted;
extract a reboot value from the second identifier included in a data packet received from a second device of the wireless network;
compare the reboot value to the reboot count; and
determine that the first identifier was assigned before the first device was last rebooted if the reboot count is greater than the reboot value.

18. The computer-readable storage medium of claim 17, further comprising instructions to cause the radio network controller to:
include the reconstructed first identifier in a message; and
page the access terminal with the message, the message being configured to cause the access terminal to close the session and initiate the new session with the first device of the wireless network.

19. The computer-readable storage medium of claim 17, further comprising instructions to cause the radio network controller to:
close the session;
establish the new session between the first device of the wireless network and the access terminal; and
transfer information associated with the session to the new session established between the access terminal and the first device of the wireless network.

20. The computer-readable storage medium of claim 17, wherein the communication path comprises a communication path between the first device and the second device of the wireless network, and wherein the second device comprises a packet data serving node.

* * * * *